United States Patent [19]

Patino et al.

[11] Patent Number: 5,184,059

[45] Date of Patent: Feb. 2, 1993

[54] EXPANDED BATTERY CAPACITY IDENTIFICATION SCHEME AND APPARATUS

[75] Inventors: Joseph Patino; Jose M. Fernandez, both of Plantation; Henry A. Bogut, Coral Springs, all of Fla.

[73] Assignee: Motorola, Inc., Schaumburg, Ill.

[21] Appl. No.: 760,413

[22] Filed: Sep. 16, 1991

[51] Int. Cl.[5] .......................................... H01M 10/44
[52] U.S. Cl. .......................................... 320/15; 320/39
[58] Field of Search ..................... 320/15, 2, 39, 20; 364/482, 483

[56] References Cited

U.S. PATENT DOCUMENTS

| | | | |
|---|---|---|---|
| 3,781,658 | 12/1973 | Godshalk | 324/29.5 |
| 4,006,396 | 2/1977 | Bogut | 320/2 |
| 4,052,656 | 10/1977 | Lavell et al. | 320/23 |
| 4,468,605 | 8/1984 | Fitzgerald et al. | 320/36 |
| 4,673,861 | 6/1987 | Dubovsky et al. | 320/2 |
| 4,680,527 | 7/1987 | Benenati et al. | 320/2 |
| 4,746,852 | 5/1988 | Martin | 320/20 |
| 4,792,986 | 12/1988 | Garner et al. | 455/89 |
| 4,965,738 | 10/1990 | Bauer et al. | 364/483 |

Primary Examiner—Steven L. Stephan
Assistant Examiner—Matthew Nguyen
Attorney, Agent, or Firm—Juliana Agon

[57] ABSTRACT

A battery charging system (10) includes a charging path (50) for charging batteries (14) which have a variety of different charging parameters requiring different optimum charging algorithms (58). The battery charging system (10) comprises a charging algorithm sensing circuit (30). At least one battery cell (14A, 14B) having a positive (23) and a negative terminal (27) and an optimum charging algorithm is to be charged. An impedance (R18) having two terminals and a value related to a predetermined charging algorithm of the cell approximating the optimum charging algorithm is coupled to one of the positive or negative terminals of the battery cell (14B). A capacitor (C72) combines with the impedance (R18) to form a characteristic related to the predetermined charging algorithm. Battery terminals (23 and 27) connected to the cell (14A and 14B) and to one of the terminals of the impedance (R18) form a battery (12) for connecting the cell (14A-B) into the battery charging system (10) with the cell (14A-B) in the charging path (50), and the impedance (R18) and the capacitor (C72) in the charging algorithm sensing circuit.

15 Claims, 4 Drawing Sheets

FIG.2

| R18(kΩ) | T1(mS) | CAP.(mAH) | LATCH VOLT.(V) | FAMILY | C72(μf) |
|---|---|---|---|---|---|
| 1.1 | 52 | 400 | 10.5 | A | 47 |
| 1.5 | 71 | 1860 | 10.5 | A | 47 |
| 2.4 | 113 | 940 | 10.5 | A | 47 |
| 2.4 | 65 | 940 | 11.2 | B | 27 |
| 3.3 | 155 | 2240 | 10.5 | A | 47 |
| 3.3 | 224 | 840 | 15.9 | C | 68 |
| 5.1 | 240 | 1320 | 10.5 | A | 47 |
| 5.1 | 138 | 1320 | 11.2 | B | 27 |
| 5.6 | 380 | 600 | 15.9 | C | 68 |
| 10 | 470 | 1500 | 10.5 | A | 47 |
| 10 | 270 | 1500 | 11.2 | B | 27 |
| 18 | 846 | 2040 | 10.5 | A | 47 |
| 18 | 486 | 2040 | 11.2 | B | 27 |
| 18 | 1224 | 300 | 15.9 | C | 68 |
| 33 | 1551 | 750 | 10.5 | A | 47 |
| 33 | 891 | 750 | 11.2 | B | 27 |
| 68 | 3196 | 2600 | 10.5 | A | 47 |

EXPANDED BATTERY CAPACITY IDENTIFICATION SCHEME AND APPARATUS

TECHNICAL FIELD

This invention relates generally to batteries and chargers, and more specifically to a scheme for detecting the capacity of a battery, to provide an optimum charging strategy.

BACKGROUND

Battery packs for portable products are typically available in a variety of capacities. U.S. Pat. No. 4,006,396 by Bogut, hereby incorporated by reference, discusses a universal battery charging scheme which provides an electrical element having a characteristic related to a predetermined charging rate of the battery in a voltage divider circuit. In this voltage divider measurement circuit, the measured voltage is directly related to the resistance of a coded resistor in accordance with the usual voltage divider relationship. This charging scheme is ideally utilized if the coded resistor's absolute value of 500 ohms, for example, would indicate a capacity of 500 mAH.

However, relying on the absolute value of the coded resistor for the correct operation of the above simple voltage divider measurement circuit is difficult to realize because of the various tolerances associated with the voltage divider circuit. Hence, a voltage tolerance window for each coded resistor instead of an absolute value needs to be delineated with each battery capacity value. Because of the potential overlapping of these voltage tolerance windows, the amount of available coded resistor values with their associated tolerance windows are limited. As new battery capacities become availabe, the need to distinguish among them correspondingly increases.

As presently implemented in a non-ideal manner in one application, the same resistor value indicates different capacities for different batteries of different portable devices such as different family types of two-way radios. This is the case, as seen in FIG. 2, where the coded resistors R18 of the A and C family type of radios are both 3,300 ohms, even though their capacities 2,240 mAH and 840 mAH, respectively. It is obvious that a battery charger generally cannot determine the correct charge capacity if two radios having different capacities were to have the same coded resistor.

Even if the same coded resistors of batteries having the same capacity are to be used with two different family types of radios, it is sometimes helpful to identify the radio family type. For example, one radio family type may have a different peak voltage level than another radio type that should not be exceeded when charging. This is the case, as seen in FIG. 2, where the coded resistors R18 of both the A and B family type of radios are both 2,400 ohms, since their capacities of 940 mAH are equal. However, the A type of radio can only be charged to 10.5 V while the B type of radio can exceed this level, as long as its maximum value is peaked at 11.2 V.

Thus, a need exists for a battery charging scheme that distinguishes between the variety of battery capacities, associated with different radio family types, available now and in the future for use in rechargeable batteries and battery packs, without changing the current non-ideal resistor coding scheme.

SUMMARY OF THE INVENTION

Accordingly, a battery charging system includes a charging path for charging batteries. Each battery has a charging parameter requiring an optimum charging algorithm. The battery charging system comprises a charging algorithm sensing circuit. At least one battery cell having a positive and a negative terminal and an optimum charging algorithm is to be charged. An impedance element having two terminals and a value related to a predetermined charging algorithm of the cell approximating the optimum charging algorithm is coupled to one of the positive or negative terminals of the battery cell. A capacitor combines with the impedance to form a characteristic related to the predetermined charging algorithm. Battery terminals connected to the cell and to one of the terminals of the impedance form a battery for connecting the cell into the battery charging system with the cell in the charging path, and the impedance and the capacitor in the charging algorithm sensing circuit.

In one aspect of the invention, one of the different charging parameters is a charging rate.

In another aspect of the invention, another one of the different charging parameters is a latch voltage.

In yet another aspect of the invention, another one of the different charging parameters is radio family identification for the battery.

BRIEF DESCRIPTION OF THE DRAWINGS

FIG. 2 is a table denoting different characteristics of a battery and its family type to be used by the microprocessor 38 of FIG. 1.

DETAILED DESCRIPTION OF THE PREFERRED EMBODIMENT

Figure 1:
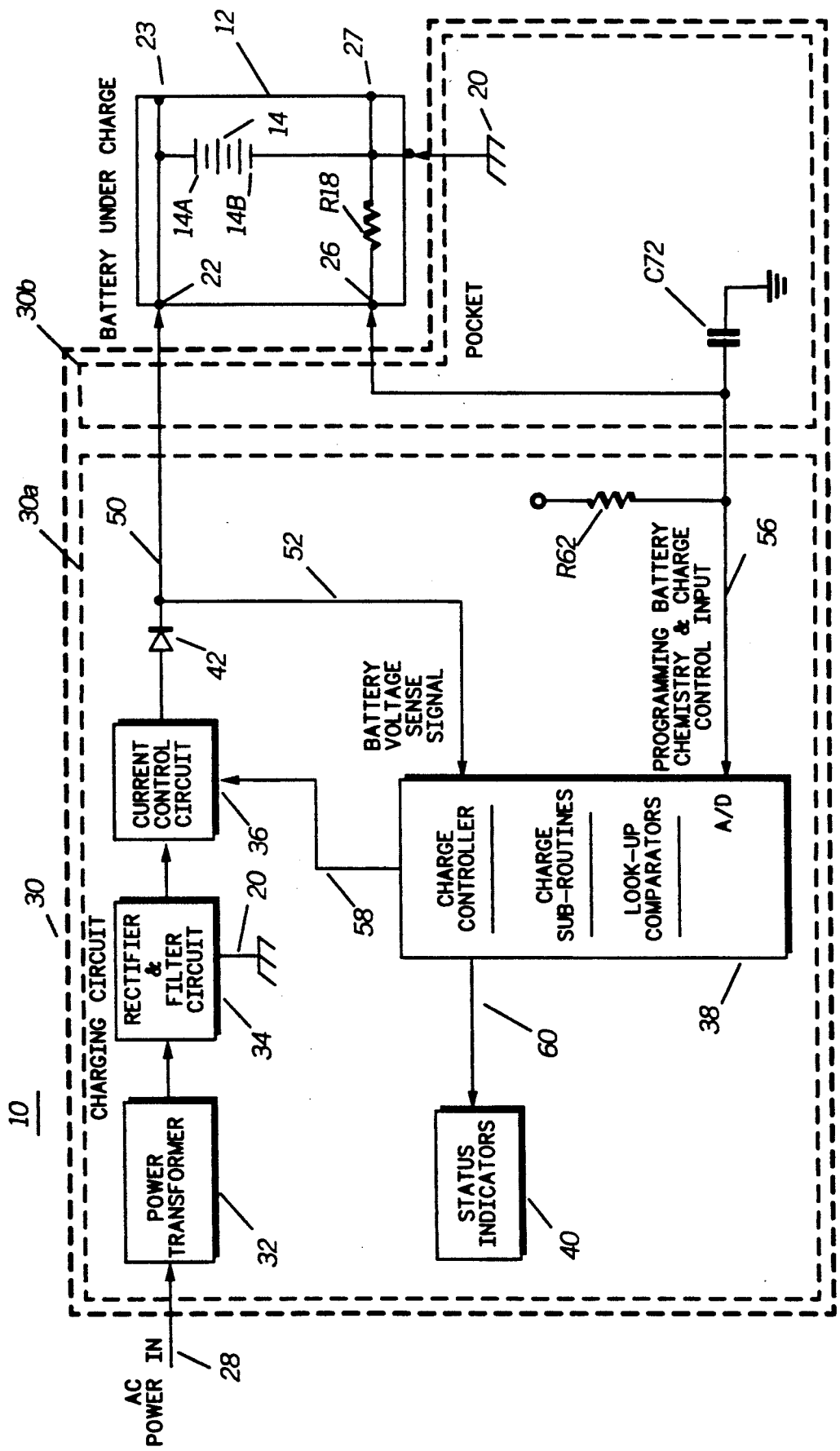
FIG. 1 is a block diagram of a battery characteristic detector in accordance with the present invention.

Referring to FIG. 1, there is shown a battery characteristic detection apparatus 10 having a charger 30, including a charging circuit 30a and a charger pocket comprising connector means 30b, and a battery 12. The charger pocket 30b is coupled to a positive and negative charger contact 22 and 26, respectively. To differentiate among the radio family types, the charger pocket 30b is uniquely shaped to fit each radio family type. When charging is desired, the battery 12 and/or the portable device (not shown) such as a radio attached, is inserted into the charger pocket 30b.

The battery 12 comprises a series of cells 14 coupled either in series or in parallel and having a positive electrode 14A and a negative electrode 14B, the negative electrode 14B being coupled to a ground point 20 and a negative battery contact 27. The positive electrode 14A is coupled to both the positive charger contact 22 and a positive battery contact 23. Contacts 23 and 27 provide the radio with the coupling points for powering the radio. Finally, the battery 12 preferably comprises an impedance such as a resistor R18 coupled between the negative charger contact 26 and the negative electrode 14B.

The charging circuit 30a comprises a transformer 32, typically for stepping down the 120VAC (28) from a conventional outlet. The stepped down voltage is rectified and filtered (34) as is known in the art. The current (50) supplied to the battery 12 is regulated by a current control circuit 36 which is in turn controlled by a charge current control signal 58 provided by a microprocessor 38. A diode 42 is further provided having a polarity selected to prevent the cells (14) from discharging into the charger 30 which is coupled to the charger contacts 22 and 26.

The microprocessor 38 is either connected to or includes conventional analog-to-digital (A/D) converter functions or the like. As is known, the microprocessor 38 is programmed to periodically measure the value of voltage connected to the A/D input. To form a charging algorithm sensing circuit, the resistor R18 is connected to the negative charger contact 26 so that a predetermined external impedance (or voltage source) may be connected to complete a voltage divider with a pull-up resistor R62. In this manner, predetermined values of voltage at the negative charger contact 26 can be calculated to provide one factor relating to the battery capacity. It is appreciated that the measured voltage Vm is directly related to the resistance of the connected resistor R18 in accordance with the usual voltage divider relationship:

$$Vm = (B^+)R18/(R62+R18). \qquad \text{[equation 1]}$$

where

Vm equals the measured voltage at the negative battery charger contact 26 or the A/D input(line);

$B^+$ = the supply voltage (i.e. as may have also just previously been measured with the aid of the A/D converter) at the A/D input;

R62 equals the known pull-up resistance internal to the charging circuit 30a;

R18 equals the unknown resistance, not necessarily associated uniquely with a particular capacity. After solving for the resistance of R18, one factor relating to the battery capacity can thus be determined.

To expand the present capability of battery capacity sensing and to allow for radio family type differentiation, utilizing the non-ideal presently coded resistor implementation, a coded capacitor C72, within the charger pocket 30b, is connected in parallel with the coded resistor 18, when the battery 12 is inserted into the pocket 30b. The coded capacitor C72 is uniquely coded for each radio family type such as seen in the exemplary table of FIG. 2 where 47uF denotes a type A radio, 27uF denotes a type B radio, and 68uF denotes a type C radio.

Figure 4:
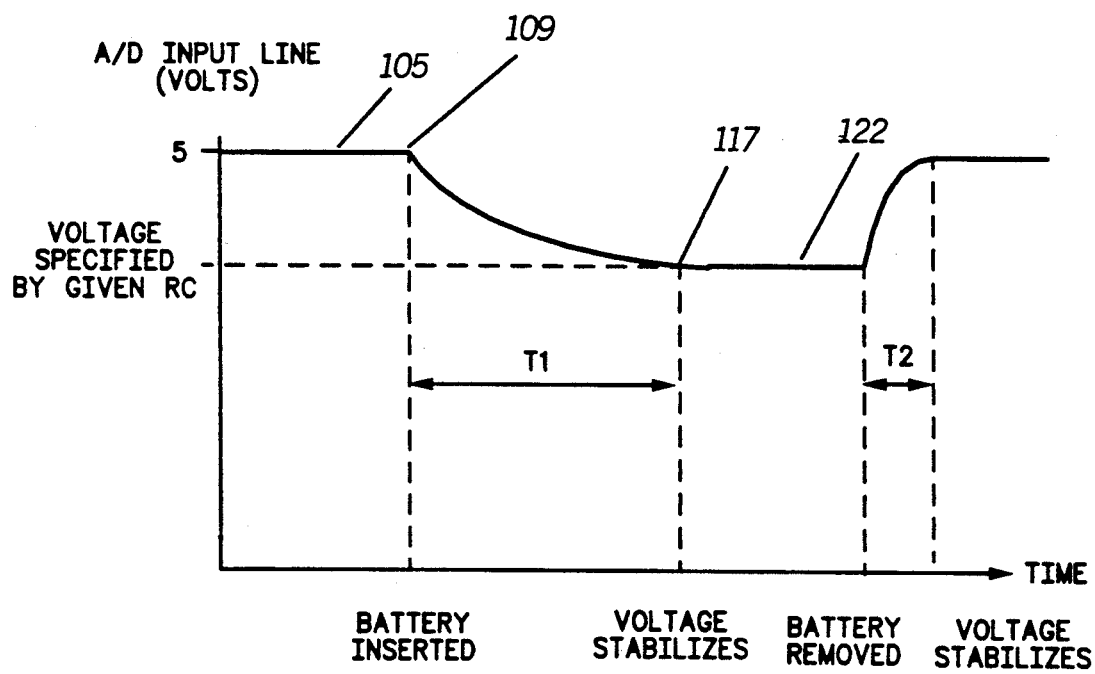
FIG. 4 is a voltage vs. time curve of the operation of the battery characteristic detector of FIG. 1 and FIG. 3.

Referring to FIG. 4, a time constant T1=R18×C72 developed by the coded resistor R18 and capacitor C72 has to elapse before the voltage Vm is stabilized enough for the resistance of the coded resistor R18 to be measured. This time constant provides a second factor which is also related to the battery capacity, aside from relating to the radio family type. From determining the time constant alone or in combination with the resistance value of the coded resistor R18, the battery capacity and the family type of the associated radio can be identified by the microprocessor 38 accessing its look-up table of FIG. 2 stored in memory.

Operationally, the charger 30 receives several feedback inputs from the battery (12) to be connected and the charger (30) itself that allows the microprocessor 38 to determine the charge algorithm to be provided to the battery 12. Preferably, these inputs would include a battery voltage sense signal 52 and a programming charge capacity control input 56. These inputs may or may not be required, depending on the batteries and radio family type involved and the charging algorithms to be used. Other inputs may be used to provide further selectivity in charging schemes.

The battery voltage sense signal 52 from the current control circuit 36 determines the polarity of the battery 12 or any other battery inserted into the charger 30, so as to provide the appropriate charge current direction. The signal 52 may also provide the battery peak voltage or latched voltage information that may be required in order to provide the appropriate charge to a variety of batteries for the corresponding radios which have different peak or latched voltages for optimal charging. The electronic element 18, indicative of battery characteristics, such as the battery capacity, embodied in this example, as the code resistor 18, is used to provide the programming of battery charge capacity control input 56. It is appreciated that any electronic element providing distinguishable and measurable values such as a resistor, inductor, capacitor, diode, memory device (RAM, ROM, EEPROM, etc.), or a pulse train modulator could be used for this function. In other words, the electronic component 18 (or in this embodiment the code resistor) will indicate to the charger one factor relating to the battery capacity. Another factor relating to the battery capacity is time constant provided by the capacitance of the coded capacitor C72 and the resistance of the coded resistor R18.

From both the resistor and time constant indications, or the time constant alone, a charging algorithm is chosen by the microprocessor from a look-up table of FIG. 2 or an appropriate memory source (RAM, ROM, EEPROM, etc.) known in the art. Then, the microprocessor, using one or more of the available A/D inputs (i.e., 52 and 56) adjusts the charge algorithm according to the inputs received to provide the appropriate charging rate. Optionally, the microprocessor 38 can provide a status signal or signals 60 to an output source or status indicator or indicators (40) that would allow a user to know such information as to what type of battery and from which radio family is being charged, or any other parameter desired.

Figure 3:
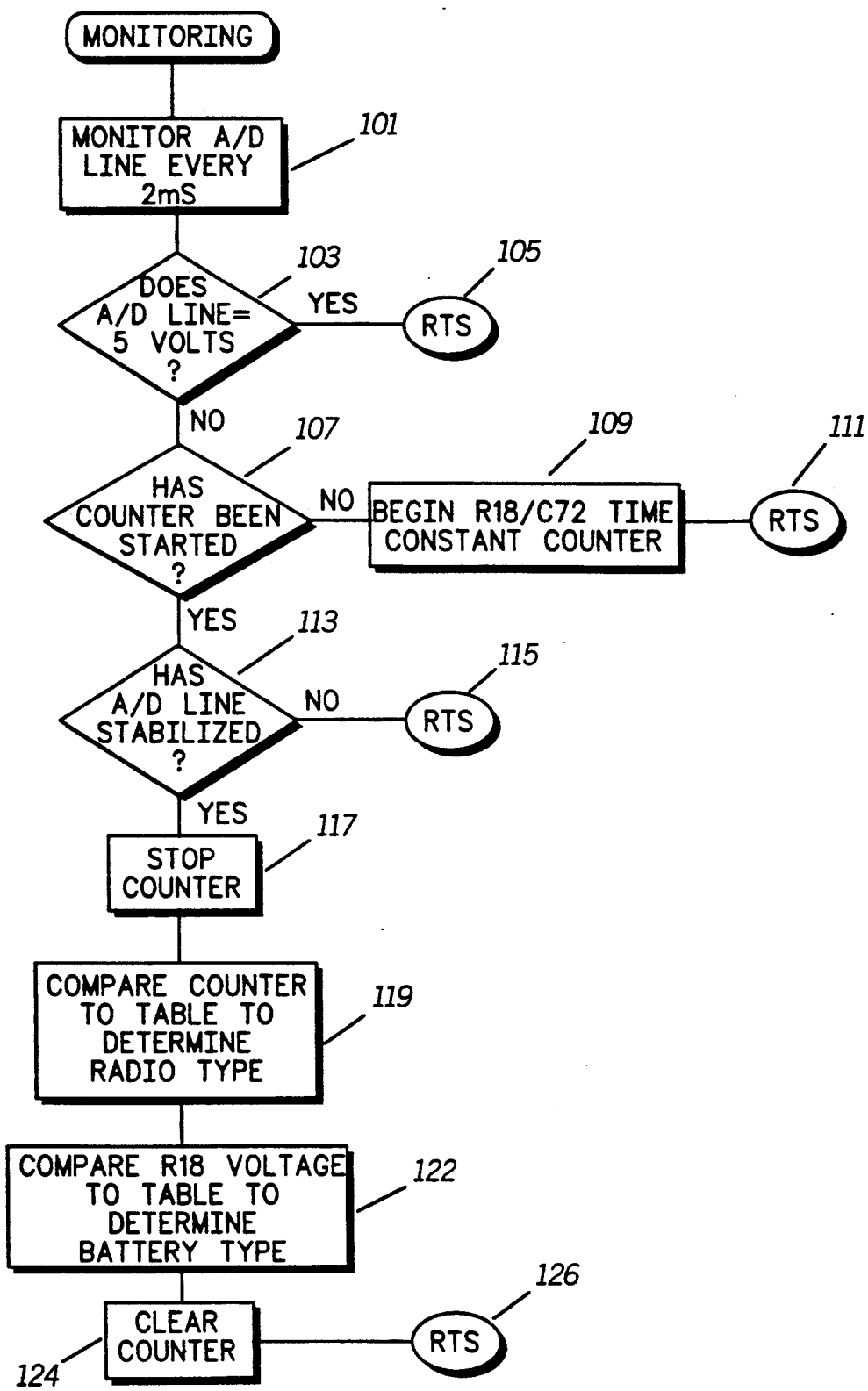
FIG. 3 is a flow chart of the battery characteristic detection scheme in accordance with the present invention.

Referring to both FIG. 3. and FIG. 4, a typical algorithm and discharge operation, respectively, in accordance with the present invention, is illustrated. In step 101, the A/D line connected to the regative charger contact 26 is periodically monitored. A decision block 103 determines whether the A/D line still measures the original supply voltage, which in this case is 5 volts. Before the battery is inserted, this constant voltage can be seen in the voltage versus time curve of FIG. 4. The voltage measured at the negative battery contact 26 is a floating constant due to the absence of the battery including the coded resistor R18 to complete the circuit. If the A/D line still measures 5V, then the "yes" path returns to the beginning of the monitoring routine in step 105.

On the other hand, when a battery is first inserted into the charger 30, the voltage on the A/D line will fall from the original supply voltage of 5 volts to the proper resistor divider level provided by the pull-up resistor R62 and the coded resistor R18 as seen in FIG. 5. The "no" path then proceeds to a decision block 107 to determine whether a counter has been started. If not, the "no" path begins an RC time constant counter in step 109 before returning to the beginning of the monitoring routine in step 111.

However, if the counter has already been started, a decision block 113 determines whether the A/D line has been stabilized yet. If "no", step 115 returns to the beginning of the monitoring routine.

On the other hand, if the counter is now stabilized, step 117 stops the counter. The counter now provides the time constant T1 as the second factor needed for the look-up table of FIG. 2. The voltage at this point is also stabilized for the microprocessor to determine the resistance value of the coded resistor R18. Knowing these two factors, a multitude of characteristics about the battery and the radio type can be known by referring to the look-up table of FIG. 2. Now that all the factors are known, step 124 clears the counter and step 126 returns to the beginning of the monitoring routine.

Actually, just knowing the time constant alone may be sufficient, since the time constant, as provided by a unique coded capacitor associated with a radio family type and the coded resistor associated with a battery capacity type (high, low, medium and degrees of battery capacity in between), is a unique number associated with a particular battery of a specific radio family in this application. Thus, the time constant alone can identify what latch voltage is necessary, the capacity of the battery, or the radio family type. However, by utilizing two factors, the time constant and the resistance value, the battery capacity sensing can be greatly expanded. In addition, the use of both the resistance value and the time constant eliminates the problem of tolerance overlap for particular time constant values that are too close.

Thus, in step 119, the counter value providing the time constant T1 is used in the look-up table of FIG. 2 to determine the radio type along with other information. In step 122, since the voltage has been stabilized, the voltage measured on the A/D line will now be the voltage associated with the coded resistor R18 and the voltage divider circuit such that the resistance can be measured. The resistance value is then used in the look-up table of FIG. 2 along with the time constant previously measured to determine the capacity for the battery type.

Instead of two separate steps 119 and 122, the values of the code resistors and the time constant can together be matched up with the look-up table of FIG. 2 stored in memory. After the combination of values is matched in the look up table, then the initial charge conditions including current, voltage, and time are set up. These conditions allow the microprocessor to alter the charging algorithm periodically (or continuously if desired) in accordance with the optimal charging profiles known for a given battery capacity and radio family type. Accordingly, the charger adjusts the charging current for a particular charging rate to provide for a 1 hour charge time (or alternatively, adjusts for a particular charge time for the same charge rate) for the appropriate battery capacity rating.

Once the intial charge conditions are set, the battery charging commences. Finally, the microprocessor poles the appropriate input or inputs to determine if the charge is complete. For instance, the battery voltage sense signal 52 could sense a peak voltage that the battery needs to be latched or clamped at for a particular radio family type, as dictated by the table of FIG. 2. The tailoring and adjustments of algorithms is simply a function of the status inputs received and the software or look-up comparators used to manipulate the algorithm in response to the status inputs. If the charge is not complete or the voltage is not at its peak voltage yet, the charger continues charging. Once the charger determines that a charge is complete, the charger stops charging and a display can indicate "complete".

As seen in FIG. 4 when the battery is removed, the A/D line will charge back up to the original supply voltage of 5 volts in the time constant T2 developed by the pull-up resistor R62 and the coded capacitor C72. Of course, if this time constant T2 is too high, a smaller resistor, in parallel with the pull-up resistor R62, can be switched in, to reduce the pull-up time constant T2.

In summary, the present invention allows a charger to expand its present capability of battery capacity sensing and allows for a radio family type differentiation by using both a coded resistor and a coded capacitor simultaneously to provide a time constant. This time constant uniquely identifies the battery capacity and associated radio family type in a predetermined look-up table previously stored in the charger's memory.

What is claimed is:

1. A battery charging system including a charging path for charging batteries, the system comprising:
   a charging algorithm sensing circuit;
   at least one battery cell having a positive terminal, a negative terminal, and a predetermined charging algorithm;
   resistance means for providing a resistance value, the resistance means comprising two terminals, the resistance value related to the predetermined charging algorithm of the cell;
   an identification capacitor having a stabilizing time coupled with the resistance means and coupled to one of the terminals of the battery cell to form a time constant related to the predetermined charging algorithm; and;
   the charging algorithm sensing circuit further comprising:
     means for providing an electrical current in the resistance means after the time constant;
     means for periodically measuring the voltage developed across the resistance means until the voltage has stabilized, after the stabilizing time;
     means for measuring the stabilizing time; and
     means for converting the measured stabilizing time to a predetermined identifiable battery usage.

2. A battery charging system comprising:
   at least one cell having a predetermined charging algorithm, the cell having positive and negative cell terminals;
   a first electrical element having at least two terminals, and a fixed characteristic related to the predetermined charging algorithm of the cell;
   a second electrical element having two terminals, a stabilizing time, and a fixed characteristic related to the predetermined charging algorithm of the cell;
   circuit means for identifying the second element, the circuit means connected to one of the terminals of the second electrical element, one of the terminals of the cell, and the first electrical element, the circuit means having a time constant and means for providing an electrical current in the first electrical element after the time constant;
   the circuit means producing a stable voltage after the stabilizing time, and the stabilizing time having a value related to the characteristics of the first and second electrical elements; and charging means connected to the other terminal of the second electrical element, for connection to the cell through the terminals, the charging means including control means for measuring the stabilizing time before the stable voltage is measured, for controlling a charging parameter supplied to the cell in accordance with the predetermined charging algorithm related to at least the stabilizing time measured; and the control means further comprising:

means for periodically measuring the voltage developed across the first electrical element until the voltage has stabilized, after the stabilizing time;

means for measuring the stabilizing time by recording an elapsed time, starting when the measured voltage starts to change and stopping when the measured voltage stops changing; and means for converting the measured stabilizing time to a predetermined identifiable battery usage.

3. A battery charging apparatus wherein each battery includes at least one cell, the cell having a positive cell terminal, a negative cell terminal, and a predetermined charging algorithm, the battery having a first identification electrical element, the first identification element having two device terminals and a fixed characteristic related to the predetermined charging algorithm of the cell, one of the device terminals being coupled to one of the positive or negative cell terminals, and battery terminals being connected to the cell wherein one of the battery terminals is connected to the first identification electrical element, the battery charging apparatus comprising:

connector means including a second identification electrical element, the second identification electrical element having two terminals, a stabilizing time, and a fixed characteristic related to the predetermined charging algorithm of the cell, for making electrical connections to the terminals of the battery;

circuit means connected to the connector means for connection to one of the terminals of the second electrical element and connection through one of the terminals of the battery to the first electrical element, the circuit means having means for providing an electrical current of known value in the first identification electrical element after the stabilizing time;

the circuit means producing a stable voltage having a value related to the characteristic of the first electrical element, after the stabilizing time, and the stabilizing time having a value related to the characteristics of the first and second electrical elements; and charging means connected to the connector means for connection to the cell through the terminals, the charging means including control means for measuring the stabilizing time before the stable voltage is measured, for controlling a charging parameter supplied to the cell in accordance with the predetermined charging algorithm related to at least the stabilizing time measured; and the control means further comprising:

means for periodically measuring the voltage developed across the first identification electrical element until the voltage has stabilized to the stable voltage developed across the identification resistor by the electrical current of known value, after the stabilizing time;

means for measuring the stabilizing time by recording an elapsed time, starting when the measured voltage starts to change and stopping when the measured voltage stops changing; and means for converting the measured voltage and the measured stabilizing time to a predetermined battery identification and a predetermined battery usage, respectively.

4. The battery charging apparatus of claim 3 wherein the first electrical element is a fixed resistor.

5. The battery charging apparatus of claim 4 wherein the second electrical element is a fixed capacitor.

6. The battery charging apparatus of claim 5 wherein the circuit means includes a pull-up resistor whereby the fixed resistor associated with the battery and the fixed capacitor associated with the connector means develop the stable voltage across the fixed resistor having a value related to the value of the fixed resistor, after the stabilizing time, the stabilizing time having a value related to the values of the fixed resistor and the capacitor.

7. The battery charging apparatus of claim 3 wherein the charging means supplies a charging current to the battery, in accordance with the stable voltage and the elapsed time measured.

8. The battery charging apparatus of claim 3 wherein the connector means comprises a charger pocket including the second identification electrical element comprising a capacitor, the capacitor having a fixed capacitance for developing a time constant associated with a predetermined charging rate of the cell.

9. The battery charging apparatus of claim 3 wherein the connector means comprises a charger pocket including the second identification electrical element comprising a capacitor, the capacitor having a fixed capacitance for developing a time constant associated with a predetermined latch voltage of the cell.

10. The battery charging apparatus of claim 3 wherein the connector means comprises a charger pocket for inserting a portable radio having the battery, the pocket including the second identification electrical element comprising a capacitor, the capacitor having a fixed capacitance for developing a time constant associated with a radio family identification for the battery.

11. A battery charging system, comprising:

a battery;

charging control means for charging the battery;

adapter means coupled to the charging control means for adapting the battery for charging;

an identification capacitor having an identifiable time variable associated with a charging parameter;

resistance means for coupling with the identification capacitor to provide a stabilizing time comprising an RC time constant associated with the stabilizing time of the capacitor and the resistance means; and association means for associating the stabilizing time with the charging parameter;

the association means further comprising:

means for providing an electrical current in the resistance means after the time constant;

means for periodically measuring the voltage developed across the identification capacitor until the voltage has stabilized after the stabilizing time;

means for measuring the stabilizing time; and means for converting the measured stabilizing time to a predetermined identifiable battery usage.

12. The battery charging system of claim 11 wherein the resistance means is in the charging control means or in the battery.

13. The battery charging system of claim 12 wherein the identification capacitor is in the adapter.

14. The battery charging system of claim 11 wherein the identification capacitor is in the adapter.

15. The battery charging system of claim 11 wherein the adapter means comprises switching means for completing an electrical circuit when the battery is inserted into the adapter means.

* * * * *